April 5, 1960  K. G. MACLEISH  2,931,912
TARGET SCANNING SYSTEM
Filed Feb. 19, 1958

KENNETH G. MACLEISH
INVENTOR.

BY
ATTORNEYS

2,931,912

TARGET SCANNING SYSTEM

Kenneth G. Macleish, Rochester, N.Y., assignor, by mesne assignments, to the United States of America as represented by the Secretary of the Navy Application February 19, 1958, Serial No. 716,251

2 Claims. (Cl. 250—203)

This invention relates to a target-scanning system especially adapted for use in generating control signals for guiding a missile toward a target.

In determining the position of an intended target relative to the sighting axis or line of flight of a missile two basic target locating systems are commonly employed. One of these locates the target in terms of the angular direction to the target in each of two rectangularly related reference planes. The other locates the target in terms of the polar coordinates of the target, and the instant invention is concerned with such a system.

Most systems utilizing this polar coordinate system of target location are relatively complicated and it is therefore an object of this invention to provide such a system which utilizes but a few relatively simple and easily obtainable components.

A further object of this invention is to provide an arrangement for generating a frequency modulated signal, the amount or degree of frequency modulation being indicative of the degree of angular misalignment and the phase of the frequency modulation being indicative of the direction of misalignment.

Further objects will become apparent from the following description and claims, especially when considered in the light of the accompanying drawings wherein:

Figure 1:
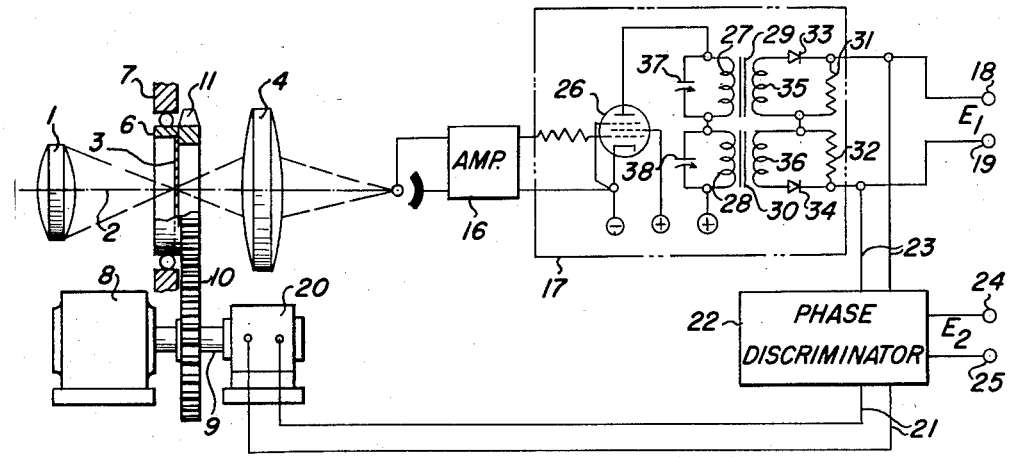
Fig. 1 is a diagrammatic showing of the improved scanning system.

Referring now to Fig. 1, the scanning system includes an objective lens 1, the axis of which corresponds to the sighting axis 2 of the guidance system. This lens is arranged to direct rays of energy emanating from a target into focus in the plane of a scanning disk 3 and thence through a collector lens 4 onto an energy responsive detector 5. Disk 3 is mounted for rotation about the axis 2 by means of a suitable ring-shaped carrier 6 rotatably mounted by suitable bearings 7 and which is adapted to be rotated at a predetermined angular velocity by means of a suitable motor 8 carrying on its shaft 9 a gear 10 adapted to mesh with mating gear teeth 11 carried on the ring 6.

Figure 2:
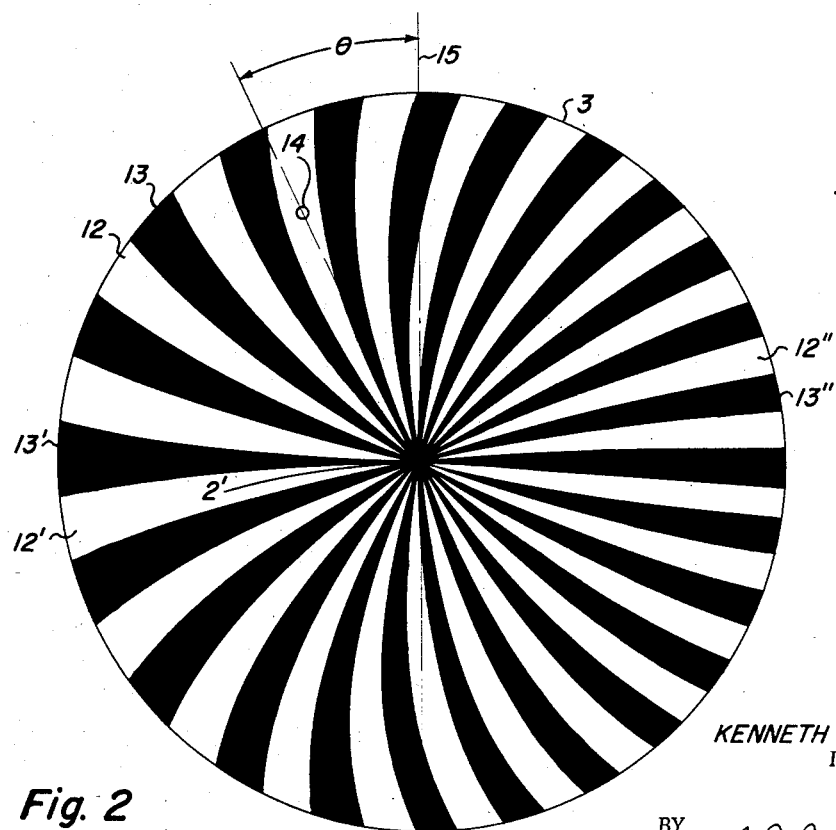
Fig. 2 is an enlarged view of the scanning disk utilized therein.

As shown in Fig. 2 disk 3 is provided with a plurality of alternately arranged transparent and opaque areas or spokes 12, 13 which extend generally radially outwardly from its center 2', which is coincident with the axis 2. As can be seen from Fig. 2 the angular spacing between and angular width of adjacent spokes varies so that the spokes 12', 13' to one side of the axis are considerably wider and further apart than are the corresponding spokes 12", 13" to the opposite side of the center. The variation in width and spacing of adjacent spokes is such that, at any given radial distance from the center the spacing varies sinusoidally throughout one complete revolution of the disk from a maximum value at 12', 13' to a minimum at 12", 13" and thence back to the maximum. Moreover, due to the slightly curved shape of some of the spokes the amount or degree of such variation is directly proportional to the radial distance from the center. With this arrangement the energy striking the disk 3 from a target and which will form a target image thereon as indicated at 14, for example, will be modulated as the spokes sweep past this target image so as to modulate the energy reaching the detector 5 at a continually varying rate, the modulations varying sinusoidally about a mean frequency during each revolution of the disk and the amount of frequency variation being directly indicative of the radial displacement of the image from the center of the disk. Moreover, the phase of the sinusoidal frequency variation with respect to a given reference signal will be indicative of the angle $\theta$ between the image and a predetermined reference line 15. Thus the output from the detector 5 will be a frequency modulated signal the frequency of which varies about a predetermined mean frequency and which will contain in the form of the amplitude and phasing of the frequency variations complete information as to the polar coordinates of the target.

In order to convert this information into a form more readily utilized for corrective control purposes, the following apparatus is provided. As shown in Fig. 1 the output from the detector 5 is appiled to an amplifier 16 and is then fed to a frequency modulation detector 17. This frequency modulation detector will produce at its output terminals 18, 19 an output voltage $E_1$, the instantaneous value of which will be directly proportional to the instantaneous output frequency from the detector 5. Since this latter will vary sinusoidally during each revolution of the disk 3 the voltage $E_1$ will similarly vary sinusoidally, the peak-to-peak amplitude of the output voltage $E_1$ being therefore directly indicative of the degree of frequency modulation and therefore of the radial displacement of the target image 14 from the center 2' of the disk. The phase of this output signal will moreover depend upon the angular position of the target image 14 relative to the reference line 15. In order to determine this phase relationship, a reference signal generator 20 is provided, this generator being directly coupled to shaft 9 of motor 8 and arranged so that it will generate a sine wave corresponding in frequency to the rate of revolution of disk 3 and having a known phase relationship thereto. This reference signal is applied as at 21 to one pair of input terminals of a conventional phase discriminator 22, the output from the frequency modulation detector 17 being applied as at 23 to the other input terminals of the phase discriminator. Thus, there will be produced at the phase discriminator output terminals 24 and 25 a second output voltage $E_2$ which will be directly indicative of the angle $\theta$ and therefore of the angular position of the target about the sighting axis and relative to the reference plane corresponding to line 15 in Fig. 2.

Thus, the two output voltages $E_1$ and $E_2$ represent the polar coordinates of the target and can be applied in known fashion to conventional control mechanisms to produce the required changes in the missile controls, voltage $E_2$ determining the direction and $E_1$ the degree of such correction.

While any type of frequency modulation detector which will produce an output voltage which is substantially linearly related to the output frequency of the detector 5 could be employed, the frequency modulation detector 17 shown in Fig. 1 has been found to be extremely well adapted for this purpose. As shown, the output from the amplifier 16 is applied between the cathode and control grid of a suitable pentode 26. The positive voltages applied to the screen and anode of this pentode, the bias on the grid, and the level of the amplified signal appearing at the output of amplifier 16 are preferably so related that the negative-going halves of the signal applied to the grid will be ineffective to affect the anode current while the positive-going halves will be of sufficient amplitude that they will drive the anode current to saturation levels. Thus, so long as the input signal is above some predetermined minimum value, pentode 26 will act as a limiter to eliminate any undesired amplitude modulations present in the input signal. Connected in series with the anode of tube 26 and in series with one another are the primary windings 27 and 28 of a pair of output transformers 29 and 30. A pair of similar load resistors 31 and 32 are connected through diodes 33 and 34 to the output windings 35, 36 of these transformers, the output windings 35 and 36 being connected together in series as shown, and the diodes 33 and 34 being so polarized that the voltage $E_1$ at any instant constitutes the difference between the voltages generated across load resistors 31 and 32. Capacitors 37 and 38 are provided across the input windings 27 and 28 of the transformers to resonate the latter at frequencies close to the mean output frequency from the detector 5. However, one of these transformers will be tuned to a frequency somewhat above this mean frequency, while the other will be tuned to a correspondingly lower frequency. By proper choice of components an output characteristic of the frequency modulation detector can be obtained which is, throughout the range of frequencies involved, substantially linearly related to the input frequency.

It can be readily seen that a relatively simple target scanning system has been disclosed which entirely fulfills the objects of the invention and which may be readily adapted for the control of guided missiles or similar devices. While other types of scanning patterns could be provided on the disk 3, the arrangement shown is most effective in enabling the use of simple means to obtain the desired output control voltages. While also frequency modulation detectors of other types might be utilized in place of the detector 17 shown herein, here again this particular form of detector has been found to be extremely well adapted for this purpose. Obviously, many other specific changes could be made without departing from the spirit and scope of the invention as defined by the appended claims.

I claim:

1. A target scanning system responsive to energy emanating from a target for determining the position of the target relative to the sighting axis of said system, comprising an energy responsive detector, means for directing such energy into substantial focus in a given image plane and thence onto said detector, a scanning disk lying in said image plane and mounted for rotation about said axis, and means for rotating said disk at a predetermined angular velocity, said disk including a plurality of angularly spaced alternately arranged energy transparent and opaque areas extending from said axis in a generally radial direction, the angular spacing between and angular width of successive transparent areas at any given radial distance from said axis varying sinusoidally between maximum and minimum values at opposite sides of said disk, the extent of such variation being directly proportional to such radial distance, whereby upon rotation of said disk the energy striking said detector from a target will be frequency modulated by said scanning disk, the degree of such frequency modulation being directly indicative of the angle between said sighting axis and the line of sight to said target and the phase of such modulation relative to the rotational phase of said disk being indicative of the angular position of said target about said sighting axis relative to a reference plane through said axis.

2. A scanning system as in claim 1 further including a frequency modulation detector responsive to the output of said energy responsive detector for producing an output voltage having a peak-to-peak amplitude directly proportional to the degree of such frequency modulation, and phase detecting means comprising a reference signal generator for producing a reference signal having known phase relationship with the rotation of said disk and a phase discriminator conjointly responsive to said first output voltage and said reference signal to produce a second output voltage directly indicative of the phase difference therebetween.

References Cited in the file of this patent

UNITED STATES PATENTS

| 2,425,541 | Konet | Aug. 12, 1947 |
| 2,813,460 | Wallin | Nov 19, 1957 |